United States Patent
Baker et al.

(10) Patent No.: US 8,380,596 B2
(45) Date of Patent: Feb. 19, 2013

(54) FLAT FEE MORTGAGE

(75) Inventors: Charlotte F. Baker, Lexington, SC (US); Gregory Carl Ogden, Charlotte, NC (US); Michael J. Kelly, Minneapolis, MN (US); Nicholas Koutouras, Studio City, CA (US); Courtnie R. Kingsley, Augusta, KS (US); Dwight Guerry Wimberly, Athens, GA (US); Andrew H. Burk, Penryn, CA (US); Loren B. Carpenter, Grapevine, TX (US); Shanna L. Austin, Chester, VA (US)

(73) Assignee: Bank of America Corporation, Charlotte, NC (US)

( * ) Notice: Subject to any disclaimer, the term of this patent is extended or adjusted under 35 U.S.C. 154(b) by 282 days.

(21) Appl. No.: 12/754,554

(22) Filed: Apr. 5, 2010

(65) Prior Publication Data
US 2011/0246345 A1    Oct. 6, 2011

(51) Int. Cl.
*G06Q 40/00* (2012.01)
(52) U.S. Cl. .......................................................... 705/35
(58) Field of Classification Search ...................... 705/35
See application file for complete search history.

(56) References Cited

U.S. PATENT DOCUMENTS

2008/0262921 A1    10/2008    Telljohann et al.
2009/0177576 A1*    7/2009    Cugliari ............................ 705/38
2011/0112960 A1*    5/2011    Lazerson .......................... 705/38

OTHER PUBLICATIONS

Simonoff, Jeffrey, "Mortgage rates", 2008.*
Plunkett, Jack W., Plunkett's E-Commerce and Internet Business Almanac 2009 (E-Book): E-Commerce and Internet Business Industry Market Research, Statistics, Trends and Leading Companies, Plunkett Research, Ltd., Feb 1, 2009., Ditech.com.*
Lewis, Holden, "Mortgage Closing Costs Can Be Bundled, Keeping Costs Low", bankrate.com, Jun. 19, 2004.*
Harney, Kenneth R. "'Bundled' Settlement Fees Attracting Rate Shoppers", The Washington Post, Feb 15, 2003.*

* cited by examiner

*Primary Examiner* — Eric T Wong
(74) *Attorney, Agent, or Firm* — Michael A. Springs; Moore & Van Allen, PLLC; Padowithz Alce

(57) ABSTRACT

Described herein are various apparatuses, methods, and computer program products for providing a mortgage environment that determines a flat fee for a mortgage that includes all lender and third-party fees associated with the mortgage. By providing a mortgage with a flat fee, the process of a borrower obtaining a mortgage from a lender can be easier because the borrower's worries about multiple fees, charges, and other costs can be combined into a single, flat fee. Some embodiments of the invention determine the flat fee based at least partially on analysis of various loan characteristics.

15 Claims, 6 Drawing Sheets

FLAT FEE MORTGAGE

FIELD

In general, embodiments of the present invention relate to apparatuses, methods, computer program products, and other tools for providing a flat-fee mortgage.

BACKGROUND

When a borrower obtains a mortgage from a lender, the borrower incurs a myriad of fees, charges and other costs associated with the mortgage process. The amount of the fees and charges could add substantially to the amount the borrower was considering borrowing for the property. In fact, a borrower may have to borrow more than originally anticipated for the property just to pay for the additional fees associated with the mortgage.

Further, choosing a lender from which to obtain a mortgage could be just as daunting for the borrower as actually obtaining the mortgage itself. In today's market there are many lenders from which a borrower may choose. Attempting to determine which lender to use can be difficult and depends on a host of factors including convenience, trust, interest rates, total cost, etc. Further, lenders may offer incentives in order to attract borrowers to obtain a mortgage with them as opposed to other lenders. These incentives can add to the difficulty the borrower faces in determining which lender to choose because different lenders offer different incentives. Therefore, the incentives offered add another variable to the considerations the borrower must take into account when comparing the lenders.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Described herein are various apparatuses, methods, and computer program products for providing a mortgage environment that determines a flat fee for a mortgage that includes all lender and third-party fees associated with the mortgage. By providing a mortgage with a flat fee, the process of a borrower obtaining a mortgage from a lender can be easier because the borrower's worries about multiple fees, charges, and other costs can be combined into a single, flat fee. Borrowers also will no longer be surprised at closing by all of the various different and perhaps unexpected mortgage fees and costs in the closing costs. Some embodiments of the invention determine the flat fee based at least partially on analysis of various loan characteristics and a determination as to the which loan characteristics act as key drivers in affecting lender and/or third-party fees associated with a new mortgage.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Reference will now be made to the accompanying drawings to describe some embodiments of the invention, wherein.

DETAILED DESCRIPTION OF EMBODIMENTS OF THE INVENTION

Figure 1:
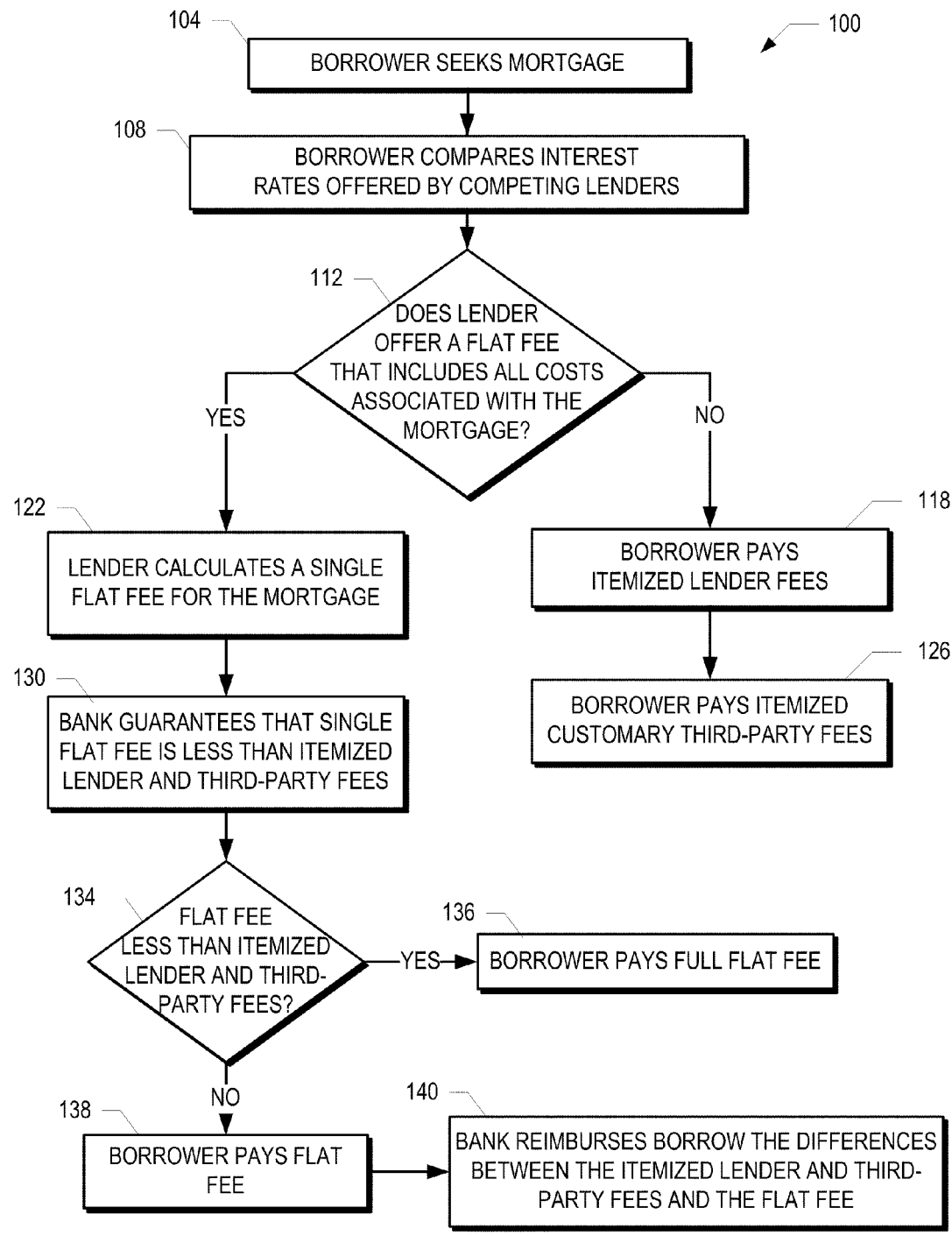
FIG. 1 provides a flow diagram illustrating a process for securing a mortgage, in accordance with one embodiment of the present invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

It should be understood that terms like "lender," "bank," "financial institution," and "institution" are used herein in their broadest sense. In general terms, a lender is an investor that lends money secured by a mortgage on property. Institutions, organizations, or even individuals that act as lenders may be varied in their organization and structure. Terms like financial institution are intended to encompass all such possibilities, including but not limited to banks, finance companies, stock brokerages, credit unions, savings and loans, mortgage companies, insurance companies, credit card companies, and/or the like. Additionally, disclosed embodiments may suggest or illustrate the use of agencies or contractors external to the lender to perform some of the calculations, data delivery services, and/or authentication services described herein. Furthermore, the illustrations provided herein are examples only, and a lender or institution or business may implement the entire invention on their own computer systems or even a single work station if appropriate databases are present and can be accessed.

The term "borrower" as used herein refers to any individual or any business or non-business entity that owes an obligation secured by a mortgage. For example, in a typical mortgage, a borrower transfers an interest in property to a lender as security for a debt or some other obligation.

In general terms, described herein are various apparatuses, methods, and computer program products for providing a mortgage environment that determines a flat fee for a mortgage that includes all lender and third-party fees associated with the mortgage. By providing a mortgage with a flat fee, the process of a borrower obtaining a mortgage from a lender can be easier because the borrower's worries about multiple fees, charges, and other costs can be combined into a single, flat fee.

FIG. 1 provides a flowchart illustrating an exemplary method of securing a mortgage, in accordance with at least one aspect of the present invention. The process starts at step 104, where a potential borrower seeks a mortgage. Such may be the case when a borrower decides to look into buying a home, or has already decided to buy a home and now needs financing. As indicated at block 108, the potential borrower may compare various interest rates of different lenders. Lenders may be competitive and offer near exact interest rates. As indicated at block 112, a determination is made as to whether a particular lender offers a mortgage that includes a flat fee, where the flat fee includes all lender and third-party fees and costs associated with the mortgage. If the lender does not offer a flat-fee mortgage, the process 100 moves to the step represented by block 118. However, if the lender does offer a flat-fee mortgage, the process 100 moves to the step represented by block 122.

Figure 4:
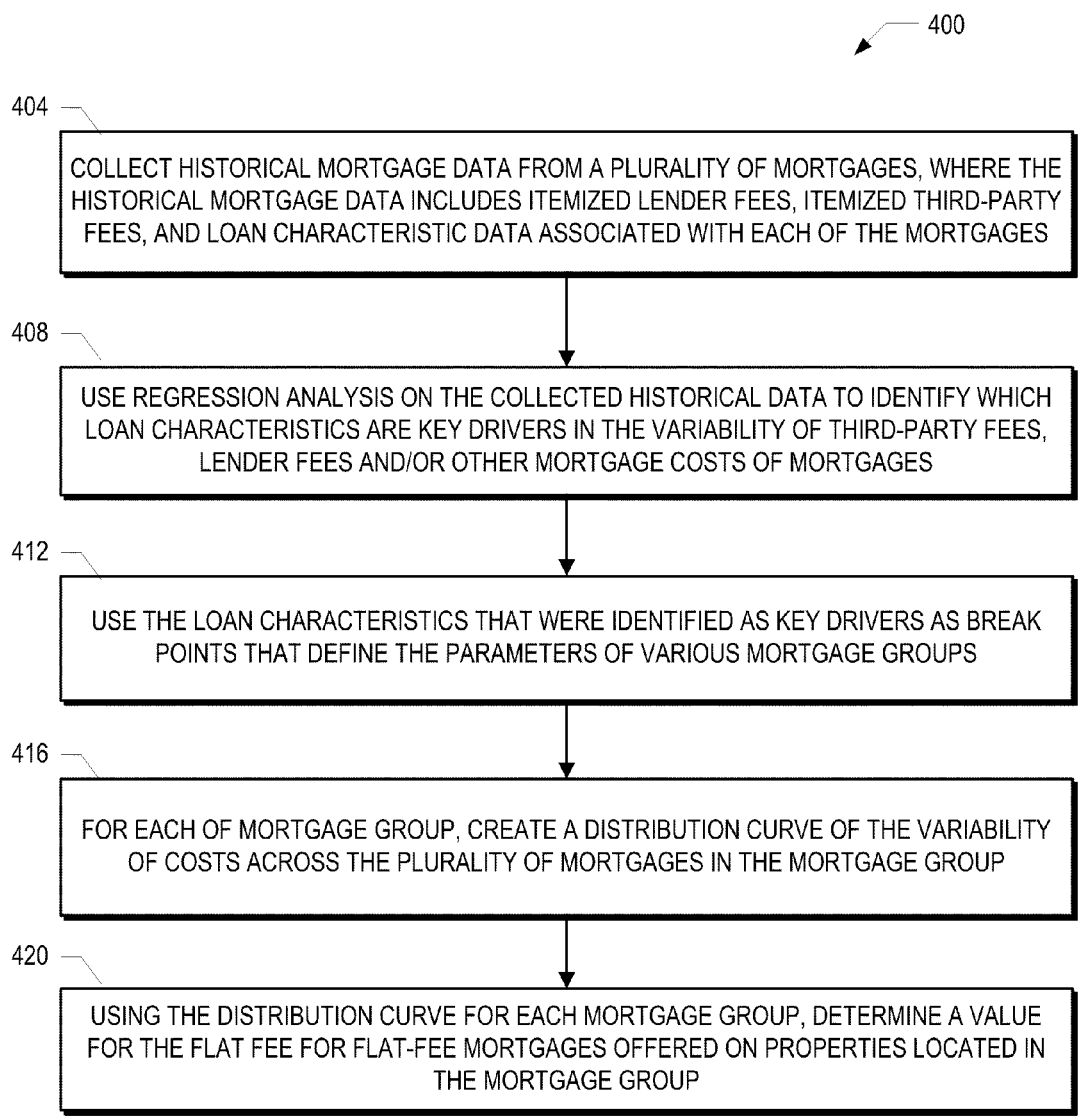
FIG. 4 provides a flow diagram illustrating an exemplary process whereby the mortgage system of FIG. 2 determines a flat fee for flat-fee mortgages based at least partially on one or more loan characteristics, in accordance with an embodiment of the invention.
Figure 5:
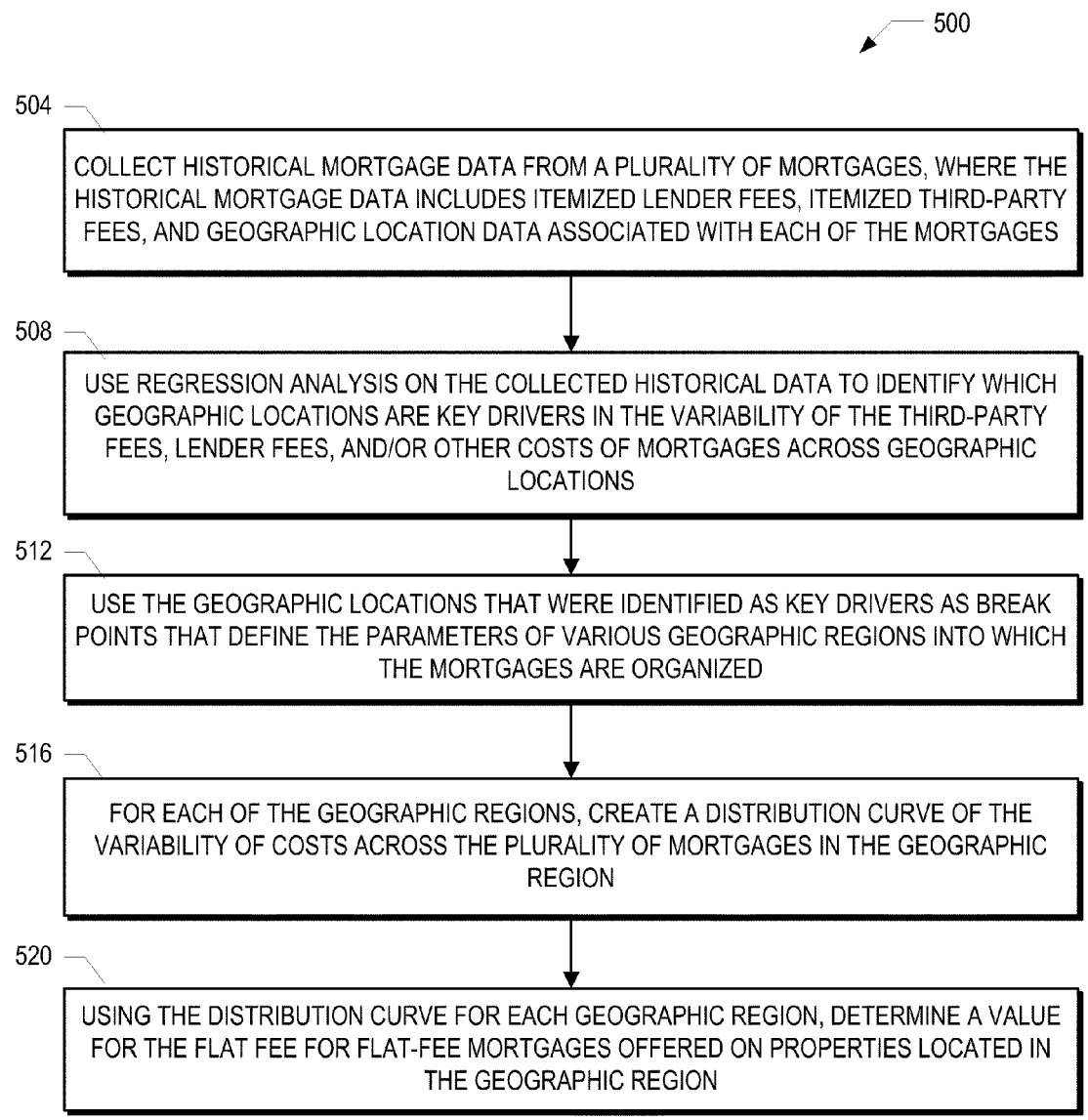
FIG. 5 provides a flow diagram illustrating an example of the process of FIG. 4 where a the mortgage system of FIG. 2 determines a flat fee for mortgages in a specific geographic region, in accordance with an embodiment of the present invention.

If the borrower were to obtain a mortgage from a lender that does not offer a flat-fee mortgage, then the borrower pays itemized lender and third-party fees, as represented by blocks 118 and 126. However, if the lender does offer a flat-fee mortgage, then, as represented by 122, a flat fee for a mortgage is calculated based on the transaction type (e.g., purchase or refinance) and/or on other loan characteristics such as, for example, the geographic location of the property, the loan type, the loan purpose, and the loan amount. Processes 400 and 500, which is described in detail below with regard to FIGS. 4 and 5, illustrating exemplary processes for determining a flat fee for mortgages based on loan characteristics, such as geographic location of the property.

After providing the flat fee, the lender may guarantee, amongst other things, that the flat fee is less than the combined fees of a competing mortgage that includes itemized lender fees and third-party fees, as indicated at block 130. Then, as represented by block 134, a determination is made as to whether the flat fee is less than the combined fees of a mortgage having itemized fees. If the flat fee is less than the combined fees of a mortgage having itemized fees, then, as represented by block 136, the borrower pays the full flat fee.

However, if the flat fee is greater than the combined fees of a mortgage having itemized fees, then, the borrower pays the flat fee, as represented by block 138, and the lender then reimburses the borrower for an amount equal to the difference between the flat fee and the itemized fees, as represented by block 140.

Figure 2:
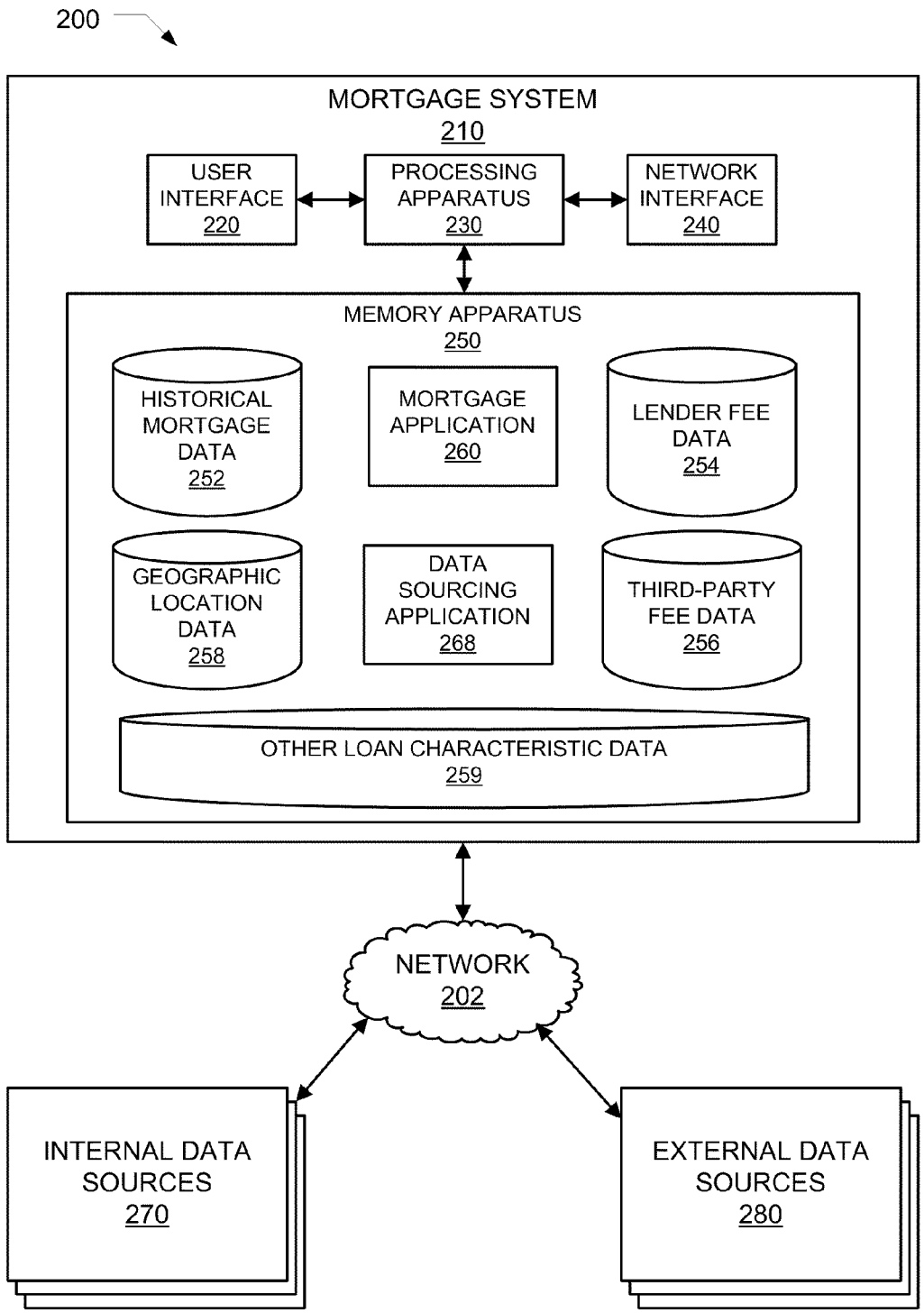
FIG. 2 provides a block diagram of a mortgage environment in which mortgage-creating processes of the present invention are carried out, in accordance with one embodiment of the present invention.

Referring now to FIG. 2, which provides a block diagram of a mortgage environment 200, in accordance with one embodiment of the present invention. The mortgage environment 200 generally includes a mortgage system 210 in communication with one or more internal data sources 270 and one or more external data sources 280 via a network 202. The mortgage system 210 comprises a user-interface apparatus 220, a network-interface apparatus 240, and a memory apparatus 250 operatively coupled to a processing apparatus 230.

As described in greater detail below, embodiments of the mortgage system 210 are generally configured to provide borrowers with flat-fee mortgages, including determining the appropriate flat fees for different geographic locations, where the flat fee includes lender and third-party fees and costs associated with the mortgage. In this regard, according to some embodiments of the invention, the mortgage system 210 is owned, maintained, operated by, or operated on behalf of one or more lenders that lend money to borrowers. The mortgage system 210 may, in some embodiments, be integrated with other systems of such one or more lenders and may share at least some hardware, software, and/or other resources with such other systems.

It should be appreciated that the mortgage system 210 may be owned, maintained, or operated by a third party that provides mortgage-pricing information to subscribing lenders. For example, subscribing lenders may submit information about a potential borrower's mortgage application that has consented to its information being shared or made public, and the third party, using the mortgage system 210, provides the subscribing lender with mortgage-pricing information specific to the applied-for mortgage that is the subject of the potential borrower's application.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art that, although FIG. 2 illustrates the user interface 220, network interface 240, memory apparatus 250, and processing apparatus 230 as separate blocks in the block diagram, these separations may be merely conceptual. In other words, in some instances, the user interface 220, for example, is a separate and distinct device from the processing apparatus 230 and the memory apparatus 250 and therefore may have its own processor, memory, and software. In other instances, however, the user interface 220 is directly coupled to or integral with at least one part of the processing apparatus 230 and at least one part of the memory apparatus 250 and includes the user interface input and output hardware used by the processing apparatus 230 when the processing apparatus 230 executes user input and output software stored in the memory apparatus 250.

As will be described in greater detail below, in one embodiment, the mortgage system 210 is entirely contained within a user terminal, such as a personal computer or mobile terminal, while, in other embodiments, the mortgage system 210 includes a central computing system, one or more network servers, and one or more user terminals in communication with the central computing system via a network and the one or more network servers. FIG. 2 is intended to cover both types of configurations as well as other configurations that will be apparent to one of ordinary skill in the art in view of this disclosure.

The user interface 220 includes hardware and/or software for receiving input into the mortgage system 210 from a user and hardware and/or software for communicating output from the mortgage system 210 to a user. In some embodiments, the user interface 220 includes one or more user input devices, such as a keyboard, keypad, mouse, microphone, touch screen, touch pad, controller, and/or the like. In some embodiments, the user interface 220 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 240 is configured to receive electronic input from other devices in the network 202, including the internal data sources 270 and the external data sources 280. In some embodiments, the network interface 240 is further configured to send electronic output to other devices in a network. The network 202 may include a direct connection between a plurality of devices, a global area network such as the Internet, a wide area network such as an intranet, a local area network, a wireline network, a wireless network, a virtual private network, other types of networks, and/or a combination of the foregoing.

The processing apparatus 230 includes circuitry used for implementing communication and logic functions of the mortgage system 210. For example, the processing apparatus 230 may include a digital signal processor device, a microprocessor device, and various analog-to-digital converters, digital-to-analog converters, and other support circuits. Control and signal processing functions of the mortgage system 210 are allocated between these devices according to their respective capabilities. The processing apparatus 230 may include functionality to operate one or more software programs based on computer-readable instructions thereof, which may be stored in the memory apparatus 250. As described in greater detail below, in one embodiment of the invention, the memory apparatus 250 includes a modeling application 260 and a data-sourcing application 268 stored therein for instructing the processing apparatus 230 to perform one or more operations of the procedures described herein and in reference to FIGS. 1, 4, and 5. Some embodiments of the invention may include other computer programs stored in the memory apparatus 250.

In general, the memory apparatus 250 is communicatively coupled to the processing apparatus 230 and includes computer-readable medium for storing computer-readable program code and instructions, as well as datastores containing data and/or databases. More particularly, the memory apparatus 250 may include volatile memory, such as volatile Random Access Memory (RAM) including a cache area for the temporary storage of data. The memory apparatus 250 may also include non-volatile memory that can be embedded and/or may be removable. The non-volatile memory can, for example, comprise an EEPROM, flash memory, or the like. The memory apparatus 250 can store any of a number of pieces of information and data used by the mortgage system 210 to implement the functions of the mortgage system 210 described herein.

In the illustrated embodiment, the memory apparatus 250 includes datastores containing mortgage data 252, lender fee data 254, third-party fee data 256, geographic location data 258, and/or other loan characteristic data 259. According to some embodiments, the lender fee data 254, the third-party fee data 256, the geographic location data 258, and the other loan characteristic data 259 are organized around the individual mortgages of the mortgage data 252. For example, in one embodiment, lender fee data 254, third-party fee data 256, geographic location data 258, and the other loan characteristic data 259 may be linked to, and thus organized around, each of the individual mortgages of the mortgage data 252. In such case, a unique identification is assigned to each individual mortgage in the mortgage data 252. Thus, each of the unique identifications is linked within the memory apparatus 250 to the corresponding mortgage's: (1) lender fee data in the lender fee data 254; (2) third-party fee data in the third-party fee data 256; (3) geographic location data in geographic location data 258; and (4) other loan characteristic data in other loan characteristic data 259. The unique identifications may be input by the user via the user interface 220, and may be stored by the processing apparatus 230 in any of the four datastores or in a separate datastore within the memory apparatus 250. Furthermore, the user may also create linkages in the memory device 250 between the unique identifications and the data within the four datastores utilizing the user interface 120.

According to some embodiments, for each mortgage, the lender fee data 254 includes a list of the lender fees and corresponding fee amounts associated with the mortgage. Further, for each mortgage, the third-party fee data 256 includes a list of the third-party fees and corresponding fee amounts associated with the mortgage.

Additionally, for each mortgage, the geographic location data 258 includes the information related to the geographic location of the property subject to the mortgage. For each mortgage, the other loan characteristic data 259 may include, for example, loan type, loan purpose, and loan amount.

For the sake of clarity and ease of description, the figures provided herein generally illustrate the mortgage data 252, lender fee data 254, third-party fee data 256, geographic location data 258 and the other loan characteristic data 259 as each being separate from one another. However, it will be understood that, in some embodiments, these datastores may be combined or the data described as being stored within such datastores may be further separated into additional datastores.

As further illustrated by FIG. 2, the memory apparatus 250 also includes the mortgage application 260 and the data-sourcing application 268. As used herein, the term "application" generally refers to computer-readable program code comprising computer-readable instructions and stored on a computer-readable medium, where the instructions instruct a processor to perform certain functions, such as logic functions, read and write functions, and/or the like. In this regard, each of the mortgage application 260 and data-sourcing application 268 includes computer-readable instructions for instructing the processing apparatus 230 and/or other devices to perform one or more of the functions described herein, such as one or more of the functions described in FIGS. 1, 4 and 5. While the mortgage application 260 and data-sourcing application 268 are drawn as separate applications within the memory apparatus 250, it should be understood that the functions of the two applications as described herein could be ascribed to a single application or more than two applications.

FIG. 2 further provides one or more internal data sources 270 and one or more external data sources 280 in communication with the mortgage system 210 via the network 202. In some embodiments, the internal data sources 270 are databases within the network of computer systems of the lender utilizing the mortgage system 210. The internal data sources 270 may contain additional data relevant to each of the mortgages. According to some embodiments, the internal data sources 270 contain information provided from third parties, such as other financial institutions and/or data aggregators, about the historical mortgages of the mortgage data 252. In some embodiments, the internal data sources 270 may be certain databases maintained by the lender. In some embodiments, all or some of the internal data sources 270 may be the four datastores of the memory device 250, as illustrated in FIG. 2.

The external data sources 280 likewise contain data relevant to the mortgages of the mortgage data 252 provided from third parties, such as other financial institutions and/or data aggregators, however, the external data sources 280 are not located within the network of computer systems of the lender utilizing the mortgage system 210. In some embodiments, both the internal data sources 270 and the external data sources 280 supply data to be relied upon by the mortgage system 210 to carry out the various processes described herein.

Figure 3:
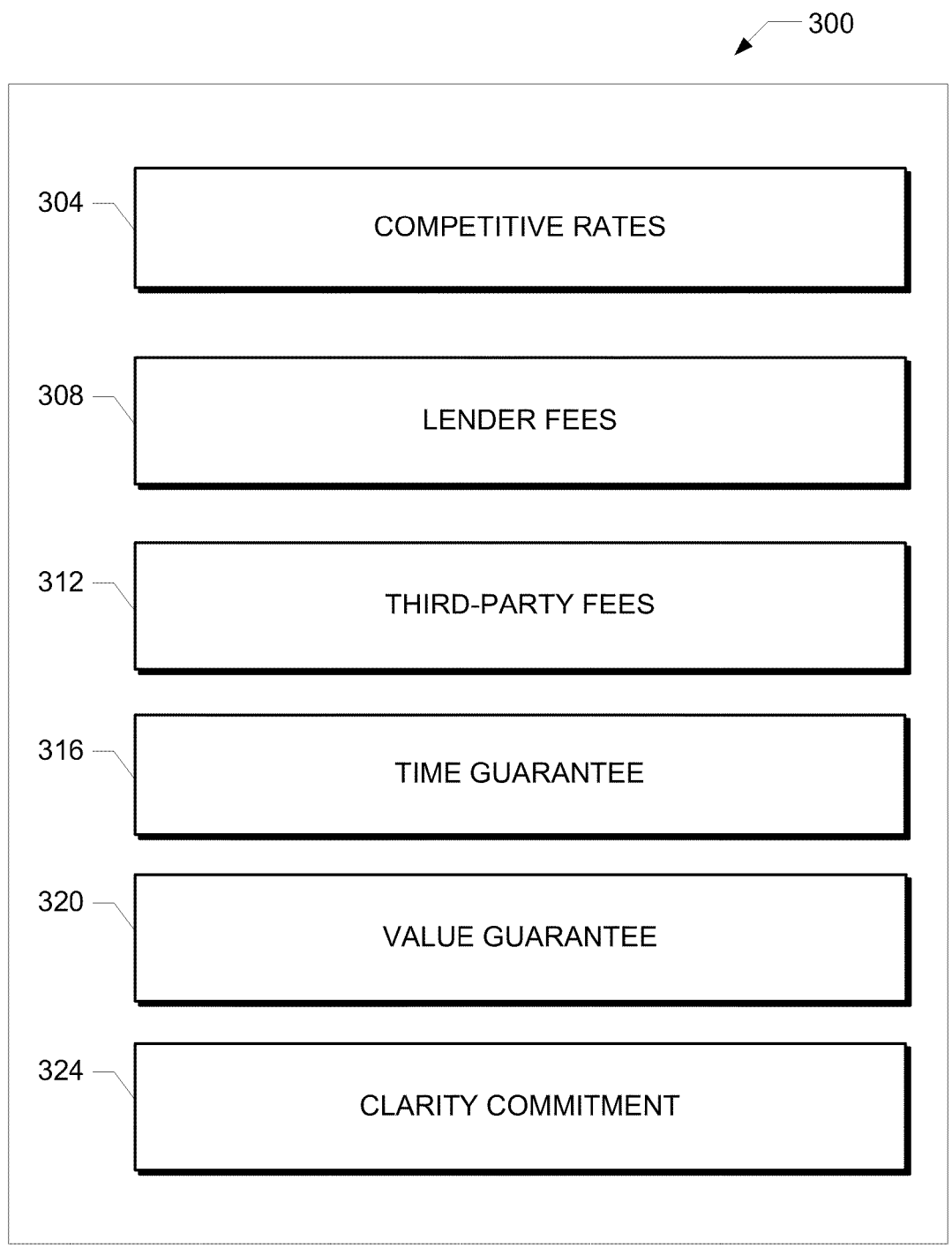
FIG. 3 provides a schematic view of an exemplary flat-fee mortgage, in accordance with an embodiment of the present invention.

FIG. 3 illustrates exemplary features of a flat-fee mortgage package 300 provided by embodiments of the present invention. In some embodiments of the invention, these features and the terms, rights, and obligations associated therewith are recorded in a tangible storage medium, such as in a non-transitory computer-readable medium. In traditional mortgages, each of the features has an associated fee/cost that the borrower has to pay on an itemized basis. The bundling of some or all of the features into a mortgage package 300 having a single flat fee may be attractive to a potential borrower, both in terms of choosing a lender and actually obtaining the mortgage once the lender has been chosen.

The interest rate used to calculate a mortgage payment is one factor a borrower may consider when selecting a particular lender. Often, a borrower will want to pay at the lowest interest rate available when possible. Lenders may set the interest rate of a particular mortgage depending on a variety of factors. Given the effect the interest rate may have on whether a borrower chooses a particular lender, lenders offer interest rates competitive with other lenders in hopes of attracting potential borrowers. In accordance with aspects of the present invention, feature 304 corresponds to a lender offering interest rates that are competitive with other lenders. The competitive interest rates combined with features bundled into a flat fee such as described herein allow a lender to have a greater chance of attracting a potential borrower as opposed to a lender with a similar interest rate but itemized fees/costs for each of the features.

Lender fees such as application fees, origination fees, mortgage arrangement fees, administration fees, etc. are fees charged by the lender in connection with obtaining a mortgage. Feature 308 corresponds to a component that is included in the flat fee of the mortgage package 300. In other words, a lender includes all lender fees related to the mortgage in the flat fee of the mortgage package 300. By eliminating the itemized lender fees via feature 308, the lender is able to provide a simple, easy to understand mortgage package 300 that appeals to borrowers, in part, because it reduces the borrower's concern associated with multiple itemized lender fees.

Third-party fees are fees paid to third parties (i.e. not the lender or the borrower) in connection with obtaining a mortgage. For example, third-party fees may include settlement fees, attorney fees, owner's title fees, title insurance, escrow fees, recording fees, appraisal fees etc. Feature 312 corresponds to a lender including all third-party fees in the flat fee for the mortgage. In accordance with one aspect, an alternative feature 312 may correspond to a lender including all customary third-party fees in the flat fee of the mortgage. A non-customary third party fee, which, according to some embodiments, is not included in the flat fee for the mortgage, might be, for example, a termite inspection, taxes, or a homeowner's inspection. When the lender includes in the flat fee all the third-party fees or all customary third-party fees, the lender is able to reduce or eliminate the borrower's concern associated with multiple itemized third-party fees. For example, if closing costs are included in the flat fee, then the borrower does not have to worry about setting aside or saving money to pay the closing costs.

Traditional systems, at best, offer discounts for closing costs. But these discounts are always fixed in nature and amount to a discount of a specified dollar-amount. These discounts are not fixed to an actual incurred cost. For example, according to some embodiments of the present invention, title fees, recording fees, and survey fees may be included in the flat fee, where the flat fee is the same for all properties located in the same geographic region. Thus, even if the fees are $1,000 for one property but only $500 for another property, the flat fees for both properties are the same. Accordingly, the borrower attempting to obtain a mortgage on a property that would incur large fees would be attracted to the flat-fee mortgage of the present invention. Further, as discussed in more detail below, a borrower attempting to obtain a low-cost mortgage would be attracted to the mortgage package 300 because a feature of the mortgage package includes reimbursing the borrow the difference between the flat fee and the actual costs of the mortgage if the mortgage actually costs less than the flat fee.

Another exemplary feature of the mortgage package 300 that the mortgage environment 200 provides is an agreement between the borrower and the lender, where the lender guarantees the loan will close within a certain time period. If the loan does not close within that certain time period, the lender will pay the borrower a specified amount of money. Under feature 316, according to some embodiments, the amount of money may be the equivalent of the borrower's first mortgage payment. For example, a lender may guarantee that the loan will close within twenty-five days. In accordance with feature 316, if the lender does not keep the promise and the customer notifies the lender of this within a certain time period, the lender will pay the borrower the equivalent of the borrower's first mortgage payment.

In accordance with another exemplary feature of the mortgage package 300, an agreement is provided between the borrower and the lender that the lender guarantees the mortgage package is the best value compared with other lenders' offers. Under feature 320, if a lender does not provide the best value to a borrower, the lender will pay the borrower a specified amount of money. The combination of some or all of the above described features into the flat-fee mortgage package 300 provides more assistance to a borrower in the process of choosing a lender. Further, the combination of some or all of the above described features into the flat-fee mortgage package 300 provides more assistance to a borrower in the process of actually obtaining a mortgage once a lender has been chosen.

In accordance with another exemplary feature of the mortgage package 300, a clarity commitment is provided by the lender and provided to the borrower. Under feature 324, the clarity commitment involves providing a clarity letter to the borrower. According to some embodiments, the clarity letter is a one-page loan summary that explains the key terms and payment information for the mortgage in plain, easy-to-understand language. For example, according to some embodiments, the clarity letter includes description of the following: monthly payment amount; interest rate; flat fee amount; and the payment period. In some embodiments, a preliminary clarity letter is created and provided to the borrower just after the borrower applies for the mortgage but before the mortgage is finalized, and then a second, final clarity letter is created and provided to the borrower after the mortgage is finalized.

In accordance with one or more aspects of the flat-fee mortgage package 300 described herein, a borrower would not have to worry about paying itemized lender or customary third-party fees and would receive best value and on-time closing guarantees. The borrower may save money compared to a mortgage in which the customer would be responsible for paying itemized lender and third-party fees and did not have the benefit of the best value guarantee. Therefore, both the monetary savings and lack of hassle would alleviate the borrower's concerns about obtaining a mortgage.

FIG. 4 provides a flow diagram illustrating an exemplary process 400 whereby the mortgage system 200 determines a flat fee for flat-fee mortgages based at least partially on one or more loan characteristics, in accordance with an embodiment of the invention. The loan characteristics may include, for example, loan type (e.g., FHA, VA, conventional, government, etc.), loan purpose (e.g., purchase or refinance), loan amount (i.e., loan size), and/or geographic area (e.g., of the property securing the loan).

As indicated at block 404, the process 400 generally begins with collecting historical mortgage data from a plurality of mortgages having different loan characteristics. For example, the step represented by block 404 includes obtaining historical lender fee data, third-party fee data, and loan characteristic data for historical mortgages having various loan characteristics. To obtain historical mortgage data, according to the illustrated embodiment, the mortgage application 260 accesses the historical mortgage data 252 of the memory apparatus 250 and obtains the unique identifier for each of a plurality of mortgages listed in the historical mortgage data 252. Then, using the unique identifiers associated with each of the mortgages, the mortgage application 260 obtains the lender fee data, the third-party data, and the loan characteristic data associated with each of the mortgages from the lender fee datastore 254, third-party fee datastore 256, and the loan characteristic datastore 259.

As described above, the lender fee data 254 includes an itemized list of lender fees for each of the mortgages. According to some embodiments, the itemized list of lender fees includes a description of each fee and the corresponding fee amount. Also, as described above, the third-party fee data 256 includes an itemized list of third-party fees for each of the mortgages. According to some embodiments, the itemized list of third-party fees includes a description of each fee and the corresponding fee amount. Further, according to some embodiments, the loan characteristic data 259 includes data related to the geographic location of the property underlying each of the mortgages, the loan type, the loan amount, and/or the loan purpose.

Next, as represented by block 408, the process 400 involves using regression analysis on the collected lender fee data and third-party fee data associated with the historical mortgages to identify which loan characteristics or combinations of loan characteristics are key factors that drive the variability of costs (i.e., lender fees and/or third-party fees) of mortgages. For example, particular lender fees and/or third-party fees may be disproportionately high for certain loan types, whereas other lender fees and/or third-party fees may be disproportionately high in other loan types. Regression analysis is used to identify groups of mortgages having common loan characteristics and particularly high fees and identify these loan characteristics as key drivers in determining mortgage costs. As those skilled in the relevant art will appreciate, regression analysis may be used to identify which among the independent variables, i.e., loan characteristics, are related to the dependent variable, e.g., lender fees and third-party fees. Further, as will be appreciated by those having skill in the relevant art, a large body of techniques for carrying out regression analysis are available. Accordingly, the regression analysis for identifying which loan characteristics drive the variability of mortgage costs can be carried out in a number of different ways.

After identifying the loan characteristics that drive variability of mortgage costs across different historical mortgages, the process 400, as represented at block 412, involves using the loan characteristics that were identified as key drivers as break points that define the parameters of various mortgage groups, where the mortgage groups are defined by these loan characteristics or combination of loan characteristics. For example, the parameters of the mortgage groups may be set to correspond to the breaks points in mortgage costs. For example, if a first group of loan amounts usually results in a disproportionately high lender fee that acts as a break point that puts mortgage costs in a first price range, and a second group of loan amounts usually results in a disproportionately high third-party fee that acts as a break point that puts mortgage costs in a second price range, then two mortgage groups may be created: (1) a first mortgage group having parameters that correspond to the boundaries of the first group of loan amounts; and (2) a second mortgage group having parameters that correspond to the boundaries of the second loan amount. According to some embodiments, a mortgage groups can be defined by certain ranges of values of loan amount, loan type, loan purposes, geographic area, and/or combinations of the above ranges of values. Further, it should be appreciated that the definition of loan characteristics is not limited to the examples provided herein and that those skilled in the art can define loan characteristics in a number of ways.

Figure 6:
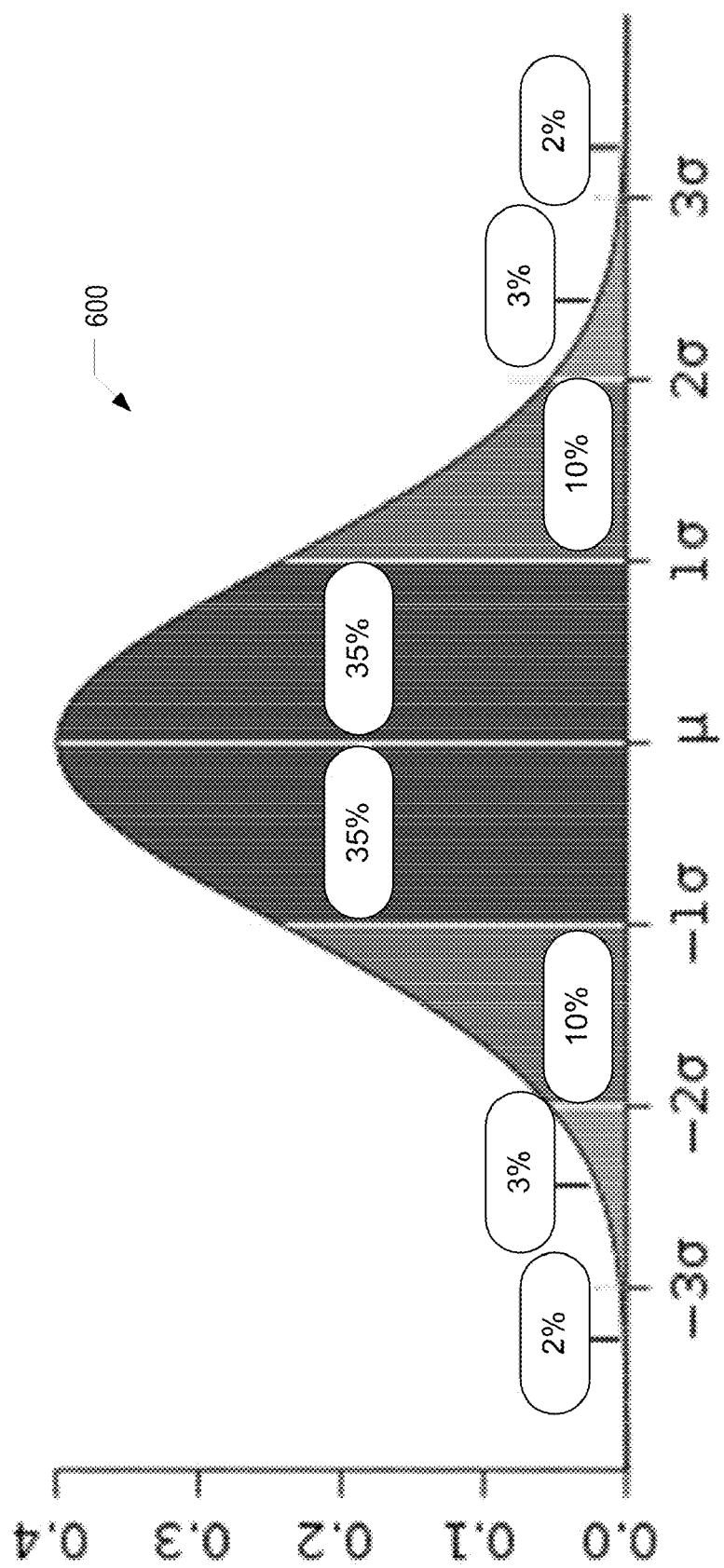
FIG. 6 provides an example of a normal distribution curve which may be used to describe the variability of costs across the mortgages in a group of mortgages defined for one or more loan characteristics, in accordance with an embodiment of the invention.

Next, as represented by block 416, the process 400 involves creating, for each mortgage group, a distribution curve of the variability of costs across the mortgages in the mortgage group. The costs represented by the distribution curves (e.g., there is one distribution curve per mortgage group) are total costs associated with each historical mortgage in the mortgage group. According to an embodiment, a normal distribution curve, such as the exemplary distribution curve 600 provided in FIG. 6, is used to describe the variability of costs across the mortgages in each of the mortgage group. As illustrated in FIG. 6, the costs of mortgages in the illustrated mortgage group tend to cluster around the mean, which is represented by μ. If the flat fee were set to a value equal to the mean, then half of the mortgages would actually cost more than the flat fee and half of the mortgages would actually cost less than the flat fee. Further, as indicated in FIG. 6, if the flat fee were set at a cost that is one standard deviation greater than the mean cost, then 85% of all mortgages would cost an amount equal to or less than the flat fee. Thus, the lender would lose money on 15% of the mortgages it provides to borrowers.

Next, as represented by block 420, the process 400 involves using the distribution curve to determine a flat fee for flat-fee mortgages offer by lenders to borrowers in the mortgage group. According to some embodiments, the flat fee is set to a value that would result in an acceptable loss, where the acceptable loss is an acceptable amount of money that would be lost due to mortgages that actually cost more than the flat fee. Further, according to some embodiments, an acceptable amount of money that would be lost due to mortgages that actually cost more than the flat fee is determined, in part, by measuring the amount of lift associated with offering flat-fee mortgages, where lift is the increase in loan origination (which may, in some instances, result in increased revenue) associated with offering flat-fee mortgages. For example, by offering flat-fee mortgages, the lender will increase its loan origination because more borrowers will obtain mortgages from the lender in order to take advantage of the above-described benefits associated with the flat-fee mortgage. Accordingly, the lender can use embodiments of the present invention to set the flat fee equal to a value that creates a loss that is less than any revenue that may result from the increased the lift created by offering flat-fee mortgages.

According to some embodiments, to determine a flat fee for flat-fee mortgages in a particular mortgage group, the mortgage application 260 obtains information about the lift associated with offering mortgages having a flat fee. Lift information, according to some embodiments, is obtained through market-research studies. Accordingly, in some embodiments, the lender conducts market-research studies directed to determining the lift that would be created by offering flat-fee mortgages. Lift is inversely proportional to the flat fee: the lower the flat fee, the higher the lift. However, the lower the flat fee, then the higher the losses associated with offering the flat fee. According to some embodiments, the lift information obtained by the mortgage application 260 includes the lift associated with a range of flat fees.

After obtaining the lift information, the mortgage application 260 determines a value for the flat fee that would result in losses that are less than any revenue associated with the lift associated with offering mortgages having a flat fee, where, as discussed above, the losses result from mortgages that actually cost more than the flat fee. Determining a value for the flat fee that would result in losses that are less than any increased revenue resulting from the lift, according to some embodiments, is done by setting the flat fee at a value that, as determined by the market research, would result in lift that is greater than losses due to mortgages that cost more than the flat fee, as determined by the distribution curve. In some embodiments, the mortgage application 260 optimizes the flat fee by setting the flat fee equal to a value that would result in the greatest delta between increased revenue due to lift and loss.

FIG. 5 provides a flow diagram illustrating an exemplary process 500 (an example of the process 400 described above with respect to FIG. 4) whereby the mortgage system 200 determines a flat fee for flat-fee mortgages based at least partially on geographic location. As indicated at block 504, the process 500 generally begins with collecting historical mortgage data from a plurality of mortgages across a plurality of geographic locations. For example, the step represented by block 504 includes obtaining historical lender fee data, third-party fee data, and geographic location data for historical mortgages on properties located in various geographic locations, such as across the entire United States. To obtain historical mortgage data, according to the illustrated embodiment, the mortgage application 260 accesses the historical mortgage data 252 of the memory apparatus 250 and obtains the unique identifier for each of a plurality of mortgages listed in the historical mortgage data 252. Then, using the unique identifiers associated with each of the mortgages, the mortgage application 260 obtains the lender fee data, the third-party data, and the geographic location data associated with each of the mortgages from the lender fee data 254, third-party fee data 256, and the geographic location data 258. As described above, the lender fee data 254 includes an itemized list of lender fees for each of the mortgages. According to some embodiments, the itemized list of lender fees includes a description of each fee and the corresponding fee amount. Also, as described above, the third-party fee data 256 includes an itemized list of third-party fees for each of the mortgages. According to some embodiments, the itemized list of third-party fees includes a description of each fee and the corresponding fee amount. Further, according to some embodiments, the geographic location data 258 includes data related to the geographic location of the property underlying each of the mortgages.

Next, as represented by block 508, the process 500 involves using regression analysis on the collected lender fee data and third-party fee data associated with the historical mortgages to identify which geographic data are key factors that drive the variability of lender fees, third-party fees, and/or other costs of mortgages across geographic regions. For example, particular lender fees and/or third-party fees may be disproportionately high in certain geographic regions, whereas other lender fees and/or third-party fees may be disproportionately high in other geographic regions. Regression analysis is used to identify these particularly high fees and identify these geographic regions as key drivers in determining the fees.

After identifying the geographic location data that drives variability of mortgage costs across geographic areas, the process 500, as represented at block 512, involves using the geographic locations that were identified as key drivers as break points that define the parameters of various geographic regions into which the mortgages are organized. For example, the parameters of the geographic regions are set to correspond to the breaks points in mortgage costs. For example, if a first group of counties has a disproportionately high lender fee that acts as a break point that puts mortgage costs in a first price range and a second group of counties has a disproportionately high third-party fee that acts as a break point that puts mortgage costs in a second price range, then two geographic regions are created: (1) a first geographic region having parameters that correspond to the boundaries of the first group of counties; and (2) a second geographic region having parameters that correspond to the boundaries of the second group of counties. According to some embodiments, a geographic region can be defined as a city, a county, a state, a zip code, an area code, latitude and longitude, a group of cities, counties, states, and/or the like. Further, it should be appreciated that the definition of a geographic region is not limited to the examples provided herein and that those skilled in the art can define geographic region in a number of ways.

Next, as represented by block 516, the process 500 involves creating, for each geographic region, a distribution curve of the variability of costs across mortgages in the geographic region. The costs represented by the distribution curves (e.g., there is one distribution curve per geographic region) are total costs associated with each historical mortgage in the geographic region. According to an embodiment, a normal distribution curve, such as the exemplary distribution curve 600 provided in FIG. 6, is used to describe the variability of costs across the mortgages in each of the geographic regions. As illustrated in FIG. 6, the costs of mortgages in the geographic region tend to cluster around the mean, which is represented by $\mu$. If the flat fee were set to a value equal to the mean, then half of the mortgages would actually cost more than the flat fee and half of the mortgages would actually cost less than the flat fee. Further, as indicated in FIG. 6, if the flat fee were set at a cost that is one standard deviation greater than the mean cost, then 85% of all mortgages would cost an amount equal to or less than the flat fee. Thus, the lender would lose money on 15% of the mortgages it provides to borrowers.

Next, as represented by block 520, the process 500 involves using the distribution curve to determine a flat fee for flat-fee mortgages offer by lenders to borrowers in the geographic region. This process is described above with respect to FIG. 4.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method of determining a flat fee for a selected mortgage, the method comprising:
   receiving, via a computing device, data taken from a plurality of historical mortgages, wherein the data for each of the plurality of historical mortgages comprises information about one or more loan characteristics and loan costs;
   determining the loan costs across the plurality of historical mortgages to identify which of loan characteristics are key drivers in loan cost associated with the historical mortgages;
   identifying, via the computing device, break points that define the parameters of a plurality of mortgage groups into which the historical mortgages cart be grouped by using loan characteristics that are identified as being key drivers in the loan cost associated with the historical mortgages;
   determining, via the computing device, for one or more of the mortgage groups, a flat fee for new mortgages having substantially the same loan characteristics as mortgages in the mortgage group based on the loan costs associated with the historical mortgages in the mortgage group;
   determining a flat fee for the selected mortgage based on the mortgage group with which the selected mortgage is associated;
   thereafter determining whether the flat fee for the selected mortgage is greater than a sum of a plurality of itemized actual lender fees and third-party fees associated with the selected mortgage; and
   if the flat fee is greater than the sum of the plurality of itemized actual lender fees and third-party fees associated with the selected mortgage, calculating a reimbursement amount equal to the difference between the flat fee for the selected mortgage and the sum of the plurality of itemized actual lender fees and third-party fees associated with the selected mortgage.

2. The method of claim 1, wherein the one or more loan characteristics comprise loan type, loan purpose, loan amount, or geographic location of property secured by the mortgage.

3. The method of claim 1, wherein determining the flat fee for each mortgage group comprises:

creating a distribution curve of the variability of cost across the plurality of historical mortgages in that mortgage group.

4. The method of claim 1, wherein the loan characteristics comprise geographic location information, and wherein the plurality of mortgage groups are defined at least in part based on a plurality of geographic regions.

5. The method of claim 1, further comprising:
for each mortgage group, determining an increase in loan origination associated with offering mortgages having a flat fee.

6. The method of claim 5, further comprising:
for each mortgage group, determining a value for the flat fee that would result in losses that are less than revenue associated with an increase in loan origination.

7. The method of claim 6, wherein the losses result from mortgages where the loan costs are greater than the flat fee.

8. A system for determining a flat fee for a mortgage, the system comprising:
a user interface;
a memory device comprising:
computer-readable program code;
data taken from a plurality of historical mortgages, wherein the data for each historical mortgage comprises:
data related to a plurality of lender fees associated with the historical mortgage;
data related to a plurality of third-party fees associated with the historical mortgage; and
data related to one or more loan characteristics of the historical mortgage; and
a computer processor operatively coupled to the user interface and the memory device and configured to execute the computer-readable program code to:
review the lender fees and third-party fees across the plurality of historical mortgages to identify which of the one or more loan characteristics are key drivers behind amounts of the lender fees and third-party fees associated with the historical mortgages;
use loan characteristics identified as being key drivers in the total cost associated with the historical mortgages to identify break points that group the historical mortgages into a plurality of mortgage groups;
for one or more of the mortgage groups, determine a flat fee for new mortgages having substantially the same loan characteristics as mortgages in the mortgage group based on the amounts of the lender fees and third-party fees associated with the historical mortgages in the mortgage group;
determine a flat fee for the selected mortgage based on the mortgage group with which the selected mortgage is associated;
thereafter calculate whether the flat fee for the selected mortgage is less than a sum of a plurality of itemized actual lender fees and third-party fees associated with the selected mortgage; and
if the flat fee is not less than the sum of the plurality of itemized actual lender fees and third-party fees associated with the selected mortgage, calculate a reimbursement amount equal to the difference between the flat fee for the selected mortgage and the sum of the plurality of itemized actual lender fees and third-party fees associated with the selected mortgage.

9. The system of claim 8, wherein the one or more loan characteristics comprise loan type, loan purpose, loan amount, geographic location of property secured by the mortgage, or a combination of the foregoing.

10. The system of claim 8, the computer processor is configured to determine the flat fee for each mortgage group based at least partially on creating a distribution curve of the variability of cost across the plurality of historical mortgages in that mortgage group.

11. The system of claim 8, wherein the loan characteristics comprise geographic location information, and wherein the plurality of mortgage groups are defined at least in part based on a plurality of geographic regions.

12. The system of claim 8, wherein the computer processor is further configured to:
for each mortgage group, determine an increase in loan origination associated with offering mortgages having a flat fee.

13. The system of claim 12, wherein the computer processor is further configured to:
for each mortgage group, determine a value for the flat fee that would result in losses that are less than revenue associated with an increase in loan origination.

14. The system of claim 13, wherein the losses result from mortgages where the loan costs are greater than the flat fee.

15. A computer program product for determining a flat fee for a mortgage, the computer program product comprising a non-transitory computer-readable storage medium having computer-readable program code stored therein, the computer-readable program code, which when executed by a computer processor, causes the computer processor to perform the steps of:
receiving data taken from a plurality of historical mortgages, wherein the data for each of the plurality of historical mortgages comprises information about one or more loan characteristics and loan costs;
reviewing the loan costs across the plurality of historical mortgages to identify which of loan characteristics are key drivers in loan cost associated with the historical mortgages;
identifying break points that define the parameters of a plurality of mortgage groups into which the historical mortgages can grouped by using loan characteristics that are identified as being key drivers in the loan cost associated with the historical mortgages;
determining, one or more of the mortgage groups, a flat fee for new mortgages having substantially the same loan characteristics as mortgages in the mortgage group based on the loan costs associate with the historical mortgages in the mortgage group;
determining a flat fee for the selected mortgage based on the mortgage group with which the selected mortgage is associated;
calculating whether the flat fee for the selected mortgage is less than a sum of a plurality of itemized actual lender fees and third-party fees associated with the selected mortgage; and
if the flat fee is not less than the sum of the plurality of itemized actual lender fees and third-party fees associated with the selected mortgage, calculating a reimbursement amount equal to the difference between the flat fee for the selected mortgage and the sum of the plurality of itemized actual lender fees and third-party fees associated with the selected mortgage.

* * * * *